(12) United States Patent
Lasater et al.

(10) Patent No.: US 11,301,090 B2
(45) Date of Patent: Apr. 12, 2022

(54) METHODS, SYSTEM, AND APPARATUS FOR TOUCHLESS TERMINAL INTERFACE INTERACTION

(71) Applicant: NCR Corporation, Atlanta, GA (US)

(72) Inventors: Zachary Taylor Lasater, Perry, GA (US); Gina Torcivia Bennett, Lawrenceville, GA (US); Kip Oliver Morgan, Atlanta, GA (US); Meenakshi Sreeraman, Waxhaw, NC (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/947,392

(22) Filed: Jul. 30, 2020

(65) Prior Publication Data

US 2022/0035479 A1 Feb. 3, 2022

(51) Int. Cl.
| | |
|---|---|
| *G06F 3/033* | (2013.01) |
| *G09G 5/08* | (2006.01) |
| *G06F 3/042* | (2006.01) |
| *G06F 3/01* | (2006.01) |
| *G06T 7/50* | (2017.01) |
| *G06Q 20/18* | (2012.01) |
| *G06F 9/54* | (2006.01) |
| *G06F 3/0488* | (2022.01) |
| *G06F 3/0482* | (2013.01) |
| *G06F 3/0485* | (2022.01) |
| *G06F 3/16* | (2006.01) |

(52) U.S. Cl.
CPC ............ *G06F 3/0425* (2013.01); *G06F 3/016* (2013.01); *G06F 3/017* (2013.01); *G06F 3/0428* (2013.01); *G06F 9/543* (2013.01); *G06Q 20/18* (2013.01); *G06T 7/50* (2017.01); *G06F 3/0482* (2013.01); *G06F 3/0485* (2013.01); *G06F 3/0488* (2013.01); *G06F 3/167* (2013.01); *G06F 2203/04108* (2013.01); *G06T 2207/10016* (2013.01); *G06T 2207/30196* (2013.01)

(58) Field of Classification Search
CPC ............ G06K 9/6202; G06Q 20/1085; G06Q 20/401; G07D 7/12; G07D 7/185; G07D 7/20; H04N 5/33
See application file for complete search history.

(56) References Cited

U.S. PATENT DOCUMENTS

2008/0207296 A1\* 8/2008 Lutnick ............... G07F 17/3244
463/16
2016/0358199 A1\* 12/2016 Van Os .............. G06Q 30/0226

\* cited by examiner

*Primary Examiner* — Insa Sadio
(74) *Attorney, Agent, or Firm* — Schwegman, Lundberg & Woessner

(57) ABSTRACT

A touch field is created around a touchscreen display, the field is in front of a touch surface of the display and the field maps to locations on the display. An operator of a terminal during a transaction is presented with transaction interface screens that are visually rendered on the display. The operator makes interface options selections, performs screen navigation, and provides date entry field inputs by placing the operator's hand within the field without touching the touch surface of the display and making hand poses, hand movements, and/or hand gestures. The poses, movements, and/or gestures are translated into touch actions and touch inputs recognized by the transaction interface and processed as operator-provided input during the transaction.

20 Claims, 13 Drawing Sheets

METHODS, SYSTEM, AND APPARATUS FOR TOUCHLESS TERMINAL INTERFACE INTERACTION

BACKGROUND

Consumers and employees of organizations have become accustomed to conducting transactions on transaction terminals, such as Self-Service Terminals (SSTs), Automated Teller Machines (ATMs), and cashier-assisted Point-Of-Sale (POS) terminals. Organizations have invested heavily in the transaction interfaces associated with these terminals to ensure transactions are conducted efficiently and without any specialized skill being required of the operators (consumers and/or cashiers/clerks/tellers).

The vast majority of transaction interfaces are provided via touchscreen displays associated with the terminals. However, with the recent world-wide COVID19 virus pandemic consumers and employees are concerned with virus transmission associated with multiple individuals all touching a same display. Employers do periodically disinfect the touchscreen displays but it unrealistic to assume that they can sanitize the displays after each transaction. More likely, the displays are disinfected at the beginning of the day, at the end of the day, and maybe between shifts of employees (depending on customer traffic).

As a result, high-risk COVID19 consumers or employees are rightly concerned about operating the terminals, especially since the transaction interfaces render touch options in the exact same locations of the displays for nearly all transactions, which ensures that everyone is touching a surface that was previously touched by multiple other customers. Moreover, customers/operators may cough or sneeze while conducting transactions onto the touchscreen displays, such that the health concerns associated with virus transmission are likely exasperated.

Employers are concerned as well because a virus-infected customer or employee may cause the organizations to have to shut the store down for sanitization (depending on local health guidelines), may cause the customers to avoid visiting the store, and/or may cause the employers to be short staffed with employees out sick. It is in everyone's best interest to create a safe and healthy environment within the stores to contribute to slowing the virus transmission rate.

Furthermore, some stores are essential and cannot be shut down during the pandemic, such as grocery stores and pharmacies. It is simply unrealistic to assume that consumers can be delivered all their needed food and medical supplies during the virus lockdowns and governments are in no position to logistically provide for all their citizens. As a result, some stores simply have to remain open and risk of spreading the virus cannot be completely eliminated.

SUMMARY

In various embodiments, methods, a system, and an apparatus for touchless terminal interface interaction are presented.

According to an embodiment, a method for touchless terminal interface interaction is provided. For example, a touch action is detected with respect to an interface rendered on a touchscreen display. The touch action is made within a field that is in front of and adjacent to a touch surface of the touchscreen display. The action is translated into an interface action that is recognized by the interface based on the field and the interface. The interface action is provided to the interface for processing as an input provided by an operator of a transaction terminal during a transaction at the transaction terminal. The operator provides the input without touching the touch surface of the touchscreen display.

BRIEF DESCRIPTION OF THE DRAWINGS

FIG. 1I is a diagram of an operator-provided input screen for touchless terminal interface interaction, according to an example embodiment.

DETAILED DESCRIPTION

Figure 1A:
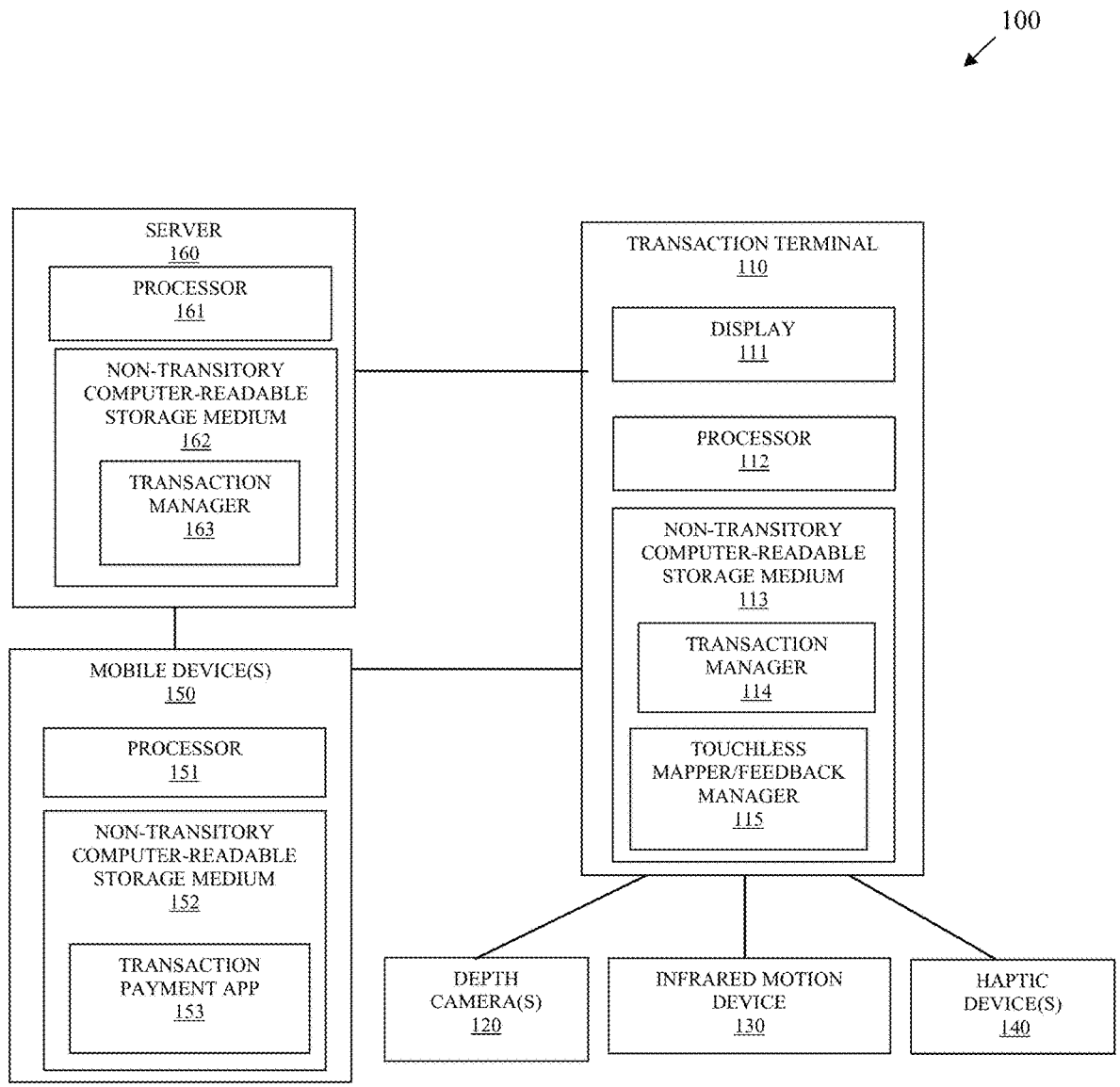
FIG. 1A is a diagram of a system for touchless terminal interface interaction, according to an example embodiment.

FIG. 1A is a diagram of a system 100 for touchless terminal interface interaction, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of touchless terminal interface interaction, presented herein and below.

System 100 includes a transaction terminal 110, one or more depth cameras 120, an infrared motion detection device 130, one or more haptic devices 140, one or more mobile devices 150, and a server 160.

Terminal 110 comprises a touch display 111, a processor 112, and a non-transitory computer-readable storage medium 113. Medium 113 comprises executable instructions for a transaction manager 114 and a touchless mapper/feedback manager 115.

Each mobile device 150 comprises a processor 151 and a non-transitory computer-readable storage medium 152. Medium 152 comprises executable instructions for a transaction payment application (app) 153.

Server 160 comprises a processor 161 and a non-transitory computer-readable storage medium 162. Medium 162 comprises executable instructions for a transaction manager 162.

As will be illustrated more completely herein and below, system 100 permits an existing transaction interface for a transaction terminal to be enhanced for receiving operator-provided inputs during transactions via air gestures or air simulated touches that do not require a physical touching of the terminal's touch display. An existing transaction terminal is also enhanced with a touchless interface apparatus that can be operated as a novel Human Input Device (HID) of the terminal. The touchless interface apparatus can be provided in a variety of manners discussed below. System 100 supports non-touch or touchless interaction with interfaces of terminal 110 and provides improved health and safety of the terminal operators, which is particularly beneficial during the present COVID19 pandemic.

During a transaction, an operator (customer and/or clerk/teller) of terminal 110 interacts with transaction manager 114 through input selections and data entries made in a transaction interface rendered by transaction manager 114 for purposes of guiding the operator through the transaction. Conventionally, this requires the operator to touch a touchscreen display and/or keypad to make selections of interface options and to provide any operator input data entries into interface fields of a given interface option. System 100 eliminates the requirement that the operator physically touch the display 111 and/or keypad (not illustrated in the FIG. 1A).

Figure 1B:
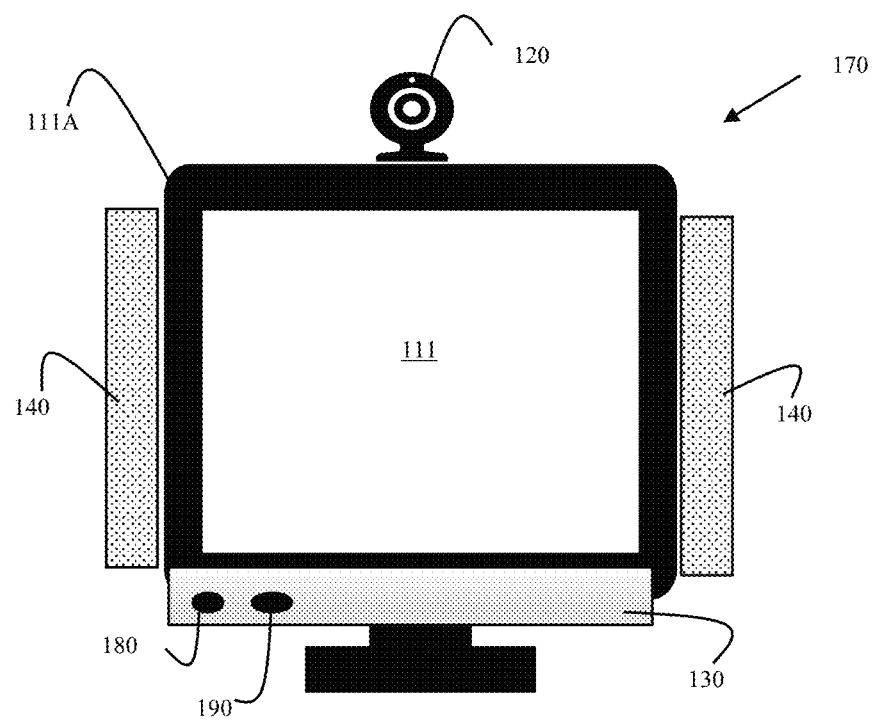
FIG. 1B is a diagram of an apparatus for touchless terminal interface interaction, according to an example embodiment.

FIG. 1B is a diagram of an apparatus 170 for touchless terminal interface interaction, according to an example embodiment.

Apparatus 170 comprises terminal display 111 (having a bezel 111A), at least one depth camera 120, at least one Infrared (IR)-based motion detection device 130, optionally one or more haptic devices 140, optionally a speaker 180, and optionally one or more lights or Light Emitting Diodes (LED(s)) 190.

Apparatus 170 surrounds display 111 and defines a logical air-based touch field that runs along the entire surface of display 111, is adjacent to the surface of display 111, and is approximately 2 centimeters (cm) in front of the outer physical touchscreen surface of display 111. The field can be laser, light, and/or motion based.

IR motion device 130 provides coordinates within the field and indications of motion within the field. Depth camera 120 provides distances between sensors of the camera with objects captured in images or video being captured by camera 120.

The field coordinates supplied by IR motion device 130 and the object images or video with distance calculations are provided in real time to touchless mapper/feedback manager 115 over port connections to terminal 110. Touchless mapper/feedback manager 115 operates as a HID device driver for the novel HID provided by apparatus 170. Touchless mapper/feedback manager 115 maps field coordinates and distances between an object image/video and the surface of display 111 to known displayed interface options and known data entry fields that are being rendered by transaction manager 114 within the transaction interface during a transaction at terminal 110. Touchless mapper/feedback manager 115 also evaluates the coordinates, distances to the surface of display 111, and/or images/video for purposes of identifying gestures or poses of an operator's hand while that hand is within the field.

Touchless mapper/feedback manager 115 utilizes an Application Programming Interface (API) to the transaction interface of transaction manager 114 to activate specific interface options, to navigate rendered screens of the interface, and to provide data entry inputs based on movements of the operator's hand within the field, based on predefined hand gestures, and/or based on predefined hand poses.

Touchless mapper/feedback manager 115 also includes an Operating System (OS) API that permits the movement of the operator's hand within the field to be visually presented within the transaction interface as a mouse arrow, a circle, or other HID selection device visual indicator. In this way, the operator can visually inspect and track movements of the hand within the field with respect to the rendered interface options and data entry fields on display 111. This allows the operator to know the location of the operator's hand with respect to the options and fields of the interface while conducting a transaction.

In an embodiment, touchless mapper/feedback manager 115 also utilizes one or more haptic devices 140 to provide an ultrasonic feedback or physically detectable vibration to the operator's hand when selections are made, when a hand is getting too close to the surface of the display 111, and/or when the hand is detected as moving too far away from the surface of display 111. Based on the reported coordinates, surface distances of the hand, and known rendered coordinates for the interface options/entry fields, touchless mapper/feedback manager 115 activates haptic devices 140 to cause one or more different types of ultrasonic feedbacks within the field.

During a transaction by an operator (consumer and/or clerk/teller), the operator traverses/navigates through the guided interface options and data entry fields through placement of the operator's hand within the field, adjacent to the surface of display 111 (but without touching the surface) and through hand gestures or hand poses. Transaction manager 114 interacts with server-based transaction manager 163 for performing item lookup (item descriptions and item pricing) and for performing transaction payment processing for the transaction. The entire transaction occurs without requiring any operator touching of the surface of display 111 and without requiring any operator touching of any keypad at terminal 1110.

In an embodiment, a consumer (one type of terminal operator) may include a mobile device 150 comprising transaction payment app 153. Payment app 153 may interact with transaction manager 114 and/or transaction manager 163 to provide a payment method and confirm payment processing. For example, transaction interface of transaction manager 114 may present a barcode once the consumer is ready for payment, which can be scanned allowing payment app 153 to link device 150 with a transaction identifier for the transaction at terminal 110 and contact transaction manager 163 where the consumer can use a registered payment card for payment or supply payment card details for an unregistered payment card, receive payment details from transaction manager 163 for the transaction, and confirm payment processing. Upon receipt of payment from a payment service associated with the payment method, transaction manager 163 sends a notification to transaction manager 153 indicating that payment was received and that the transaction completed successfully. The entire payment card processing can be achieved without entering a payment card into a card reader of terminal 110. In an embodiment, a transaction identifier displayed by the transaction interface may be manually entered on device 150 through a data entry field presented within a user-facing interface of payment app 153 to link the transaction with terminal 110; rather than using a presented barcode. It is to be noted that other token-based approaches that link a registered payment method for the user and/or device 150 with the transaction may also be used with payment app 153.

The components of apparatus 170 can be arranged differently than what is illustrated in FIG. 1B. For instance, there may be multiple depth cameras 120. A depth camera 120 may be situated on a side of bezel 111A and/or not attached at all to bezel 111A or display 111 but affixed on an entirely different surface that is adjacent to display 111. Moreover, depth camera 120 may be integrated into display 111. There can be a single haptic device 140 situated at different locations around display 111, rather than the bottom of the bezel 111A.

Additionally, apparatus 170 can be achieved entirely with one or more depth cameras 120 without any IR motion device 130; or, apparatus 170 can be achieves with just IR motion device 130 without any depth cameras 120.

In an embodiment, apparatus 170 is arranged as illustrated in FIG. 1B, with IR motion device 130 mounted or attached to a bottom of bezel 111A and includes a single depth camera 120 attached or situated at a top of bezel 111A. The corresponding apparatus 170 can have zero, one, or more than one haptic device 140.

In an embodiment, the apparatus 170 includes a speaker 180, the location of the speaker 180 can be different from what is illustrated.

In an embodiment, apparatus 170 includes one or more LEDs 190; again, the location of the LEDs 190 can be different from what is illustrated.

Figure 1C:
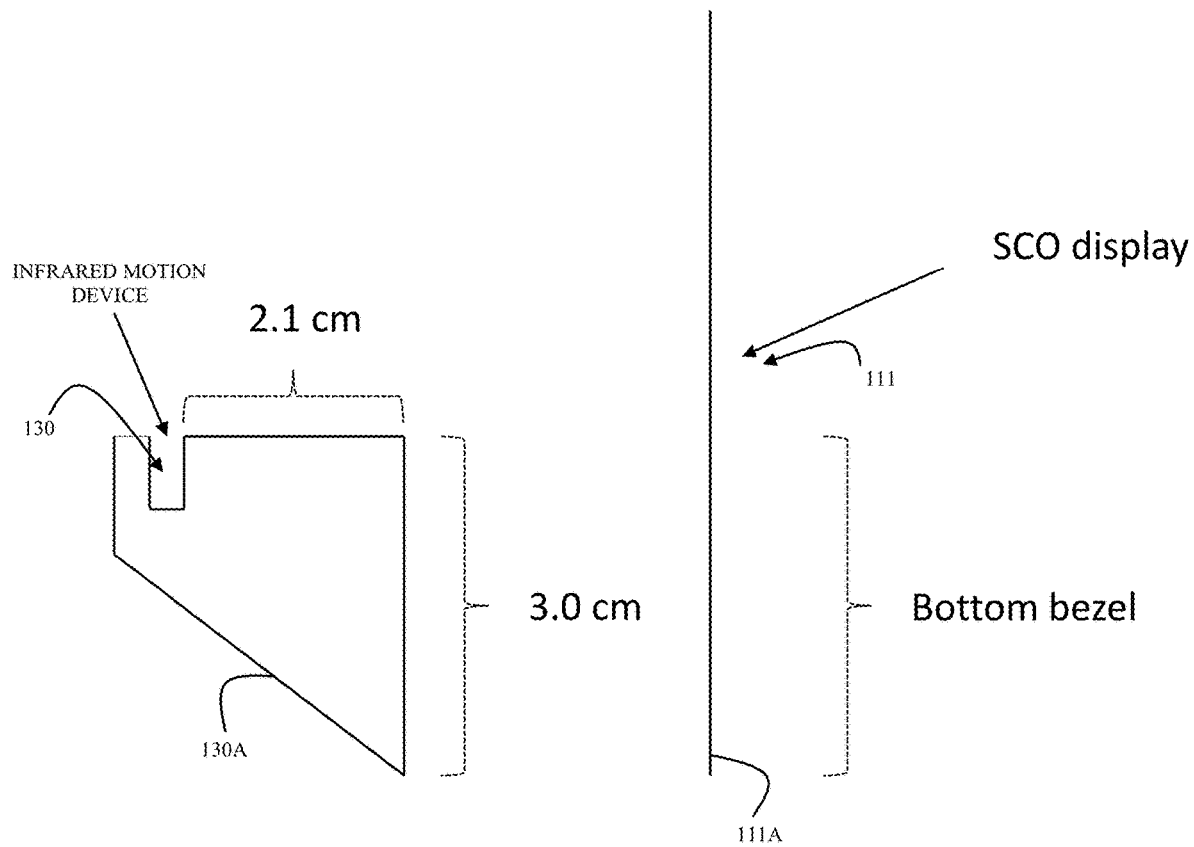
FIG. 1C is a diagram of a side view of an apparatus for touchless terminal interface interaction, according to an example embodiment.

FIG. 1C is a diagram of a side view of an apparatus 170 for touchless terminal interface interaction, according to an example embodiment.

IR motion device 130 includes a mounting apparatus 130 that includes a vertical flat surface of approximately 3 cm, a horizontal flat surface that extends at a right angle from the vertical flat surface outward away from the surface of display 111 for approximately 2.1 cm, a recessed area that holds the IR motion device 130, a small extended horizontal flat surface that extends further away from both the surface of display 111 and IR motion device 130, a second vertical surface extending down and adjoined to a diagonal surface the extends toward a bottom end of the vertical flat surface. The vertical flat surface may include an adhesive that permits mounting apparatus 130A to be adhered to the bottom portion of bezel 111A that surrounds display 111.

IR motion detection mounting apparatus 130A permits IR motion device 130 to be easily affixed to or mounted onto the bottom portion of bezel 111A of display 111.

In an embodiment, mounting apparatus 130A may include a bottom clap and/or side claps that allow the mounting apparatus to be attached to the bottom portion of bezel 111A.

In an embodiment, mounting apparatus 130A is not affixed or attached to bezel 111A; rather diagonal portion is another horizontal flat surface that sits on a same bottom surface as a stand for display 111 with apparatus 130 adjustably situated adjacent to the surface of display 111, in front of the surface of the display 111, and raised up to and slightly past the bottom portion of bezel 111A. The mounting apparatus 130A further includes leveling adjustment mechanisms that may permit the mounting apparatus 130A to be independently and separately leveled on each of its four bottom surface corners (assuming the bottom surface upon which apparatus 130A rests is not level) and also raised up vertically to the bottom of bezel 111A from the bottom surface upon which both apparatus 130A and the display stand of display 111 commonly rests.

It is noted that other configurations of mounting apparatus 130A may include clips and/or brackets that permit mounting apparatus to be attached to the bottom portion of bezel 111A.

Example rendered transaction interface screens along with animated hand movements and illustrations within the field provided by apparatus 170, hand gestures, and hand poses that are processed by touchless mapper/feedback manager 115 and now discussed with FIGS. 1D-1L.

Figure 1D:
FIG. 1D is a diagram of a transaction start interface screen for touchless terminal interface interaction, according to an example embodiment.

FIG. 1D is a diagram of a transaction start interface screen for touchless terminal interface interaction, according to an example embodiment.

The left side of FIG. 1D illustrates an animated hand to depict that an operator can start or begin a transaction by waving a hand in front of the surface of display 111 within the field. This movement is translated by touchless mapper/feedback manager 115 as if the operator had physically touched the start interface option on the surface of display 111 but the operator does not touch the start interface option at all. Rather, touchless mapper/feedback manager 115 detects within the field generated by apparatus 170 a waving motion of the hand and the touchless mapper/feedback manager translates those coordinates within the field for the hand and the motion into an API call to transaction manager 114 to select and activate the start or begin transaction option from the transaction interface.

Figure 1E:
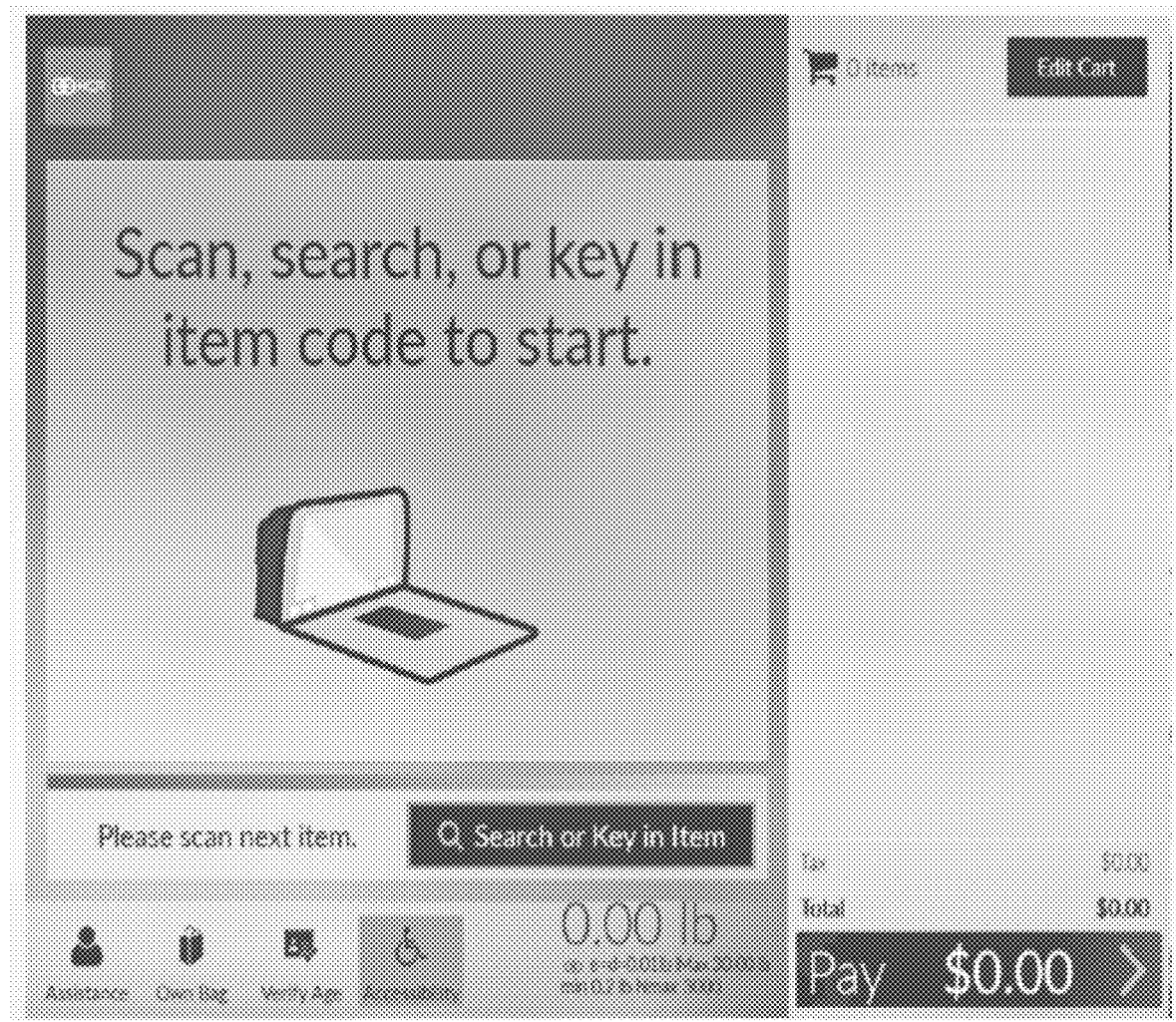
FIG. 1E is a diagram of an item entry interface screen for touchless terminal interface interaction, according to an example embodiment.

FIG. 1E is a diagram of an item entry interface screen for touchless terminal interface interaction, according to an example embodiment.

In FIG. 1E, the operator is presented with an interface screen for scanning, searching, or keying in an item code to begin the transaction processing. There is no need in this example for the operator to touch anything on the display 111, if the operator is merely going to scan an item across the scanner of terminal 110. The touchless interaction can be achieved as discussed above if the operator wanted to search or key an item code into the interface for processing by transaction manager 114.

Figure 1F:
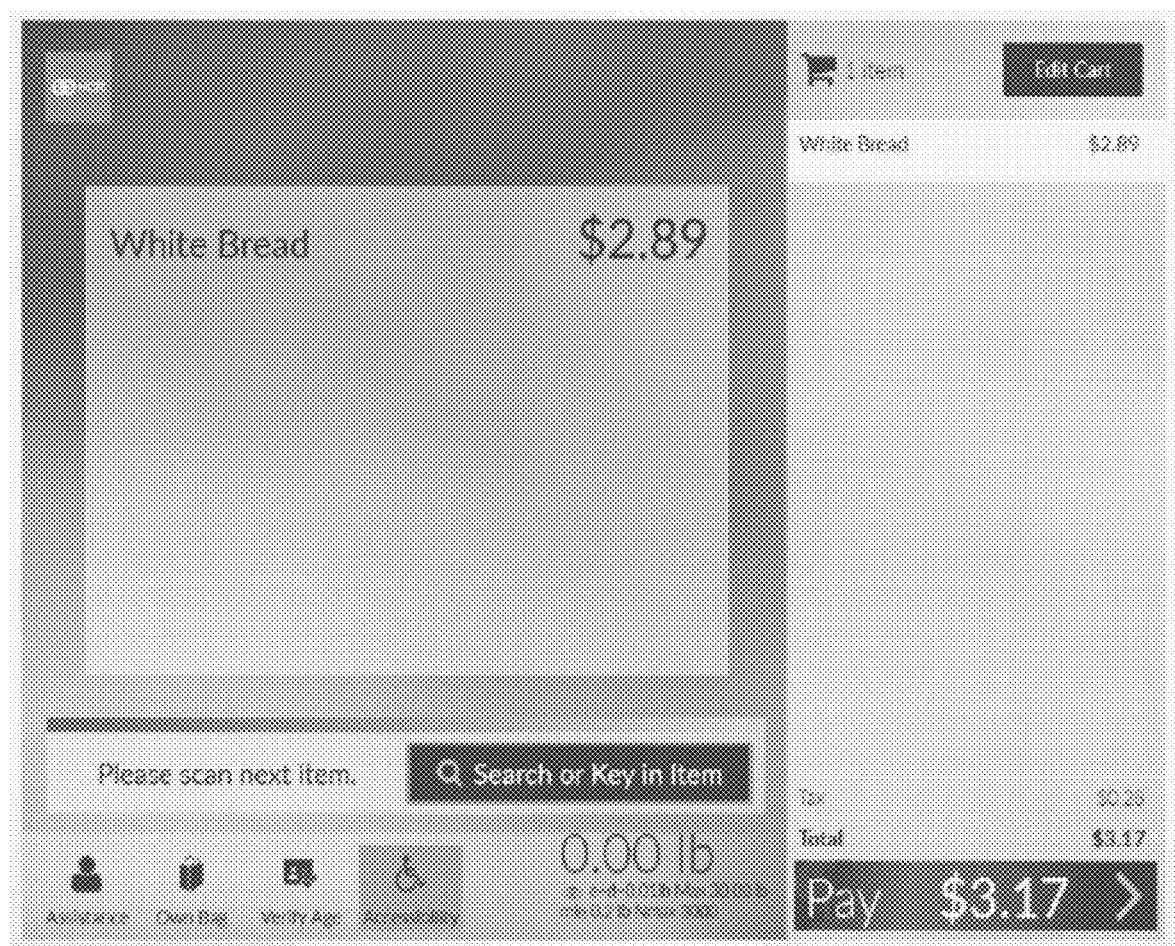
FIG. 1F is a diagram of an item entry interface screen for touchless terminal interface interaction, according to an example embodiment.

FIG. 1F is a diagram of an item entry interface screen for touchless terminal interface interaction, according to an example embodiment.

In FIG. 1F, for the example scenario being illustrated, the operator has scanned a bar code for an item representing white bread having a price of $2.89, transaction manager 114 processes the bar code lookup with transaction manager 163 and causes the rendered screen for the transaction to be updated within the transaction interface.

Figure 1G:
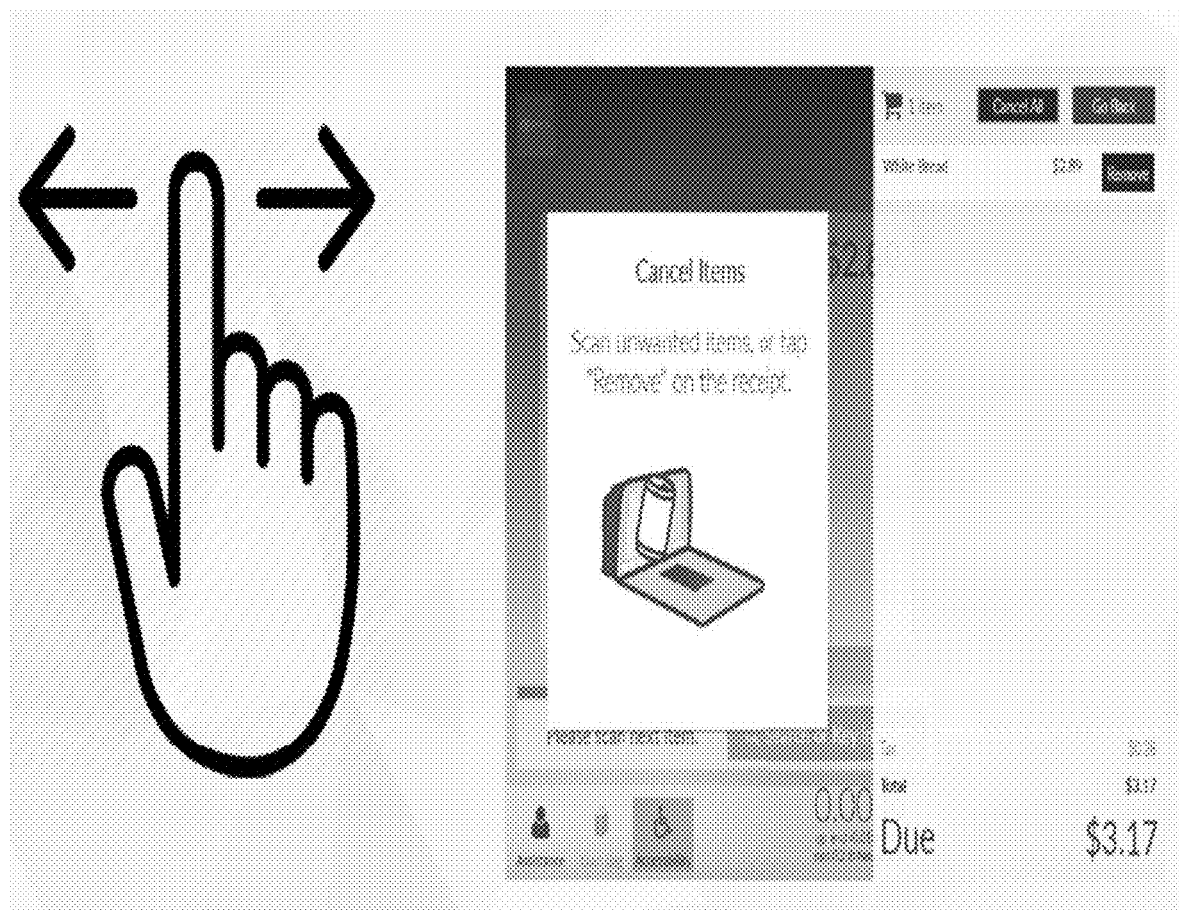
FIG. 1G is a diagram of a touchless item cancelation screen for touchless terminal interface interaction, according to an example embodiment.

FIG. 1G is a diagram of a touchless item cancelation screen for touchless terminal interface interaction, according to an example embodiment.

In FIG. 1G both an animated hand pose (thumb and index finger are extended and the remaining figures are down) and hand movement for the pose (side to side swiping action), the pose and movement is translated from the field by touchless mapper/feedback manager 115 as an interface option indicating that the operator desires to cancel and unwanted item. Touchless mapper/feedback manager 115 translates the pose and the movement into an API call for the transaction interface representing a cancel item request option and provides to transaction manager 114. Transaction manager 114 updates the interface and the rendered screen with a pop-up message providing operator instructions informing the operator how an item can be canceled or removed from the transaction being conducted on terminal 110.

Figure 1H:
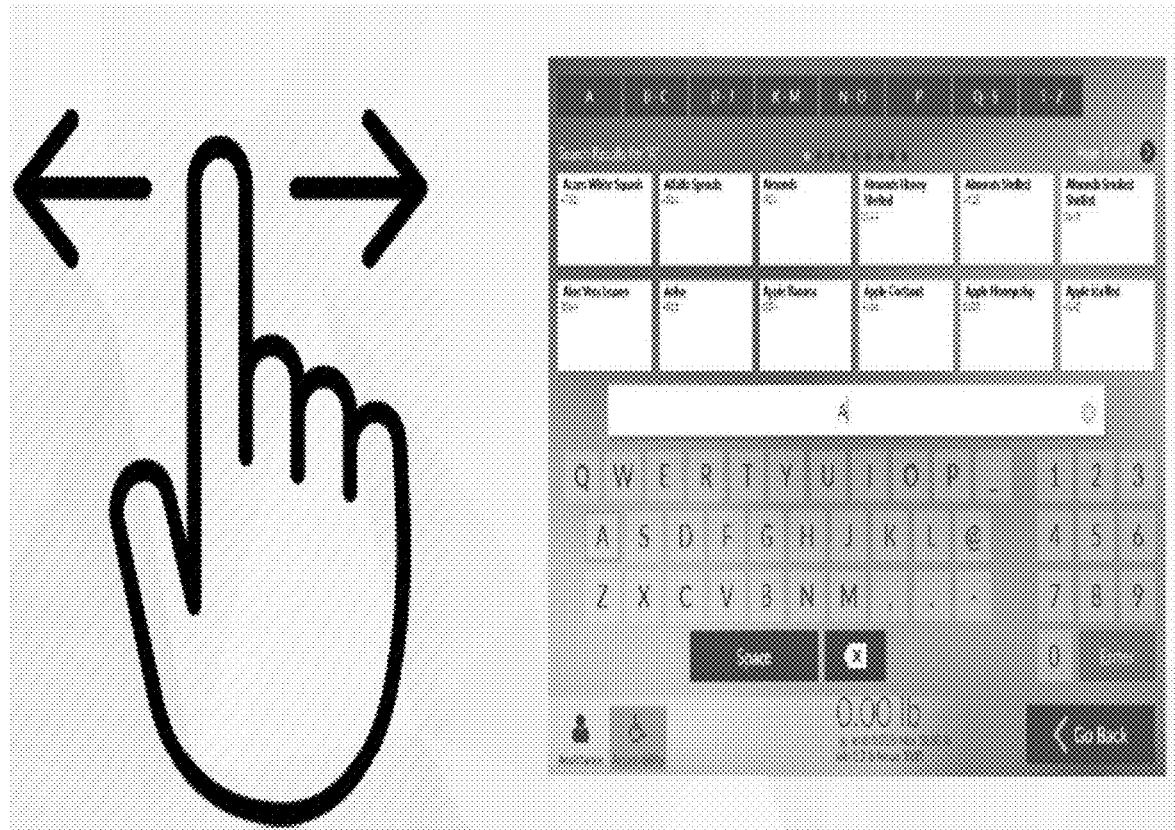
FIG. 1H is a diagram of a touchless side-to-side navigation screen for touchless terminal interface interaction, according to an example embodiment.
Figure 1H:
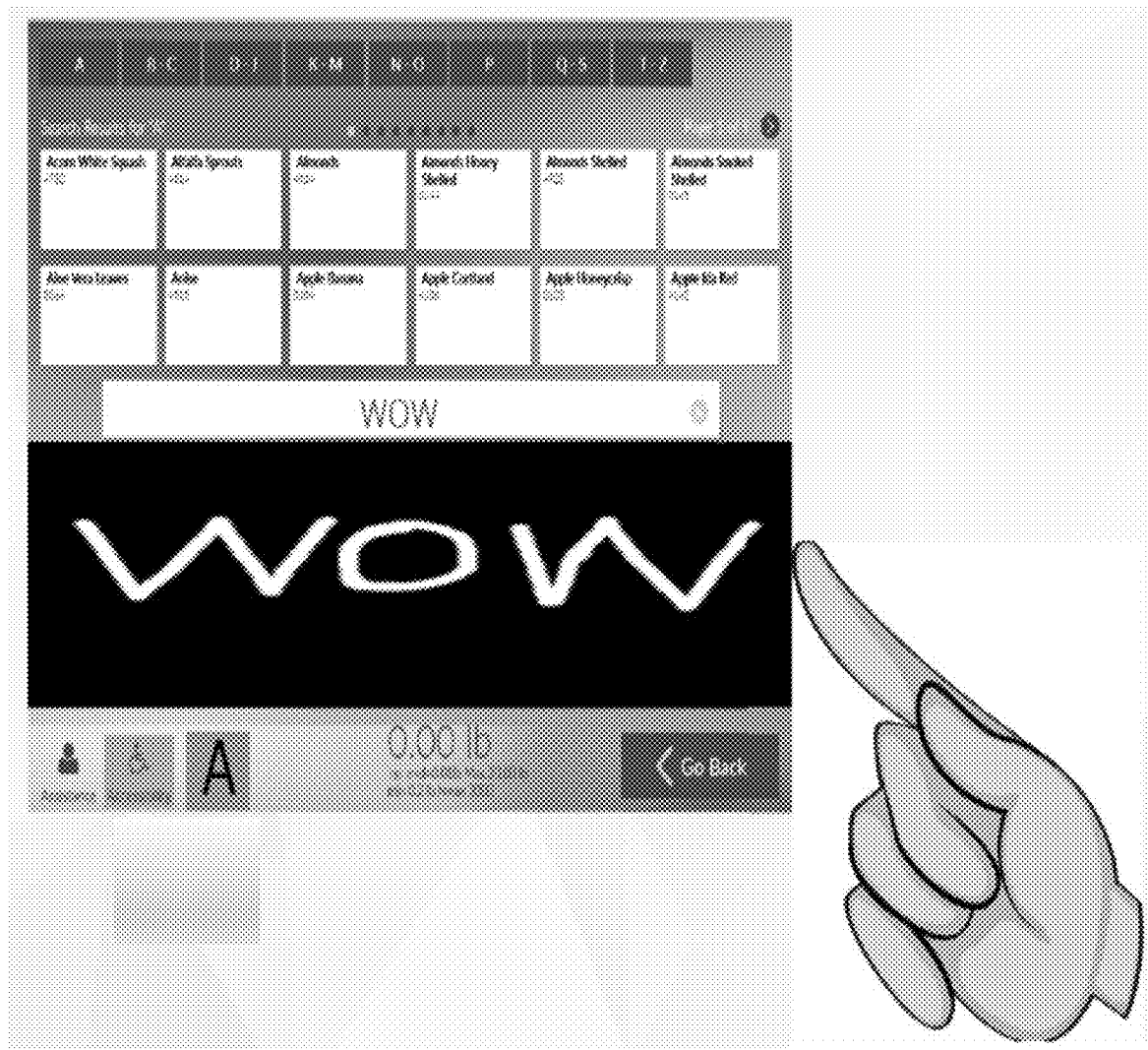

FIG. 1H is a diagram of a touchless side-to-side navigation screen for touchless terminal interface interaction, according to an example embodiment.

In FIG. 1H, a same or similar hand pose and hand gesture as was used in the example screenshot of FIG. 1G above may be interpreted by touchless mapper/feedback manager 115 as being something different depending upon the context of the transaction. In FIG. 1G the operator was in a context where items were being scanned or entered such that the hand pose and hand gesture was translated by touchless mapper/feedback manager 115 as a desire to cancel or remove an item from the transaction. In FIG. 1H, the operator had previously selected through a touch action within the field generated by apparatus 170 to search for an item and this caused the screen presented in FIG. 1H to be rendered on display 111. The operator has already made a touch action to enter an "A" into a date entry field of the rendered screen, this causes transaction manager 114 to render the screen presented in FIG. 1H with items that start with the letter "A." The hand pose (extended index finger) and hand movement (side to side) is interpreted by touchless mapper/feedback manager 115 as a screen navigation action that scrolls the item list from side to side within the presented screen. So, the context or state of the transaction interface can change how any given hand pose and hand movement are interpreted by touchless mapper/feedback manager 115 for that context or state.

FIG. 1I is a diagram of an operator-provided input screen for touchless terminal interface interaction, according to an example embodiment.

In FIG. 1I, rather than presenting a soft keyboard within the interface screen rendered as was shown in the FIG. 1H, the transaction interface may present a blackout region at the bottom of a rendered screen for an operator to directly enter letters or numbers by the operator moving an extended index finger to write a word or string ("WOW" is presented in FIG. 1I) within the field (within the air) and without touching the surface of the display 111. Touchless mapper/feedback manager 115 interprets the air/field movements of the index finger based on its changing coordinate values within the field or based on evaluation of video into the corresponding operator-defined string and uses the API to instruct transaction manager 114 to update the screen and the interface and perform any processing based on the operator air/field made string entry.

Figure 1J:
FIG. 1J is a diagram of another touchless side-to-side navigation screen for touchless terminal interface interaction, according to an example embodiment.

FIG. 1J is a diagram of another touchless side-to-side navigation screen for touchless terminal interface interaction, according to an example embodiment.

In FIG. 1J, a operator's hand is shown as moving side to side within the field generated by apparatus 170, touchless mapper/feedback manager 115 interprets the movement as a side-to-side scrolling within the current rendered screen and interacts with the API to instruct the transaction manager 114 to update the screen based on the hand movements during the transaction.

FIG. 1J also illustrates that a same operator input with respect to navigating the screens of the transaction interface can be determined based on different hand poses. That is, in FIG. 1H the hand pose used to navigate the item names rendered on the screen was an extended index finger whereas in FIG. 1J the hand pose is all fingers and the thumb are extended. So, within a given context or state of the transaction interface different hand poses and/or hand movements may be used to mean the same type of desired user input.

Figure 1K:
FIG. 1K is a diagram of an initiate transaction payment screen for touchless terminal interface interaction, according to an example embodiment.

FIG. 1K is a diagram of an initiate transaction payment screen for touchless terminal interface interaction, according to an example embodiment.

In FIG. 1K, the operator has a hand pose with an extended index finger that is moved forward within the field towards the rendered interface pay option without touching the surface of the display 111. This forward movement is detected within the field either through coordinates and through distances recorded between the end of operator's index finger and the surface of the display 111. A change in distance may be interpreted by touchless mapper/feedback manager 115 as a mouse click or a selection of a given interface option (in this example the pay option indicating the operator is ready to complete the transaction and pay for the transaction). The touchless mapper/feedback manager 115 translates the pose and the movement forward towards the surface of the display as a selection of the pay option and uses the API to instruct transaction manager 114 to initiate payment processing screens within the interface for the operator.

Figure 1L:
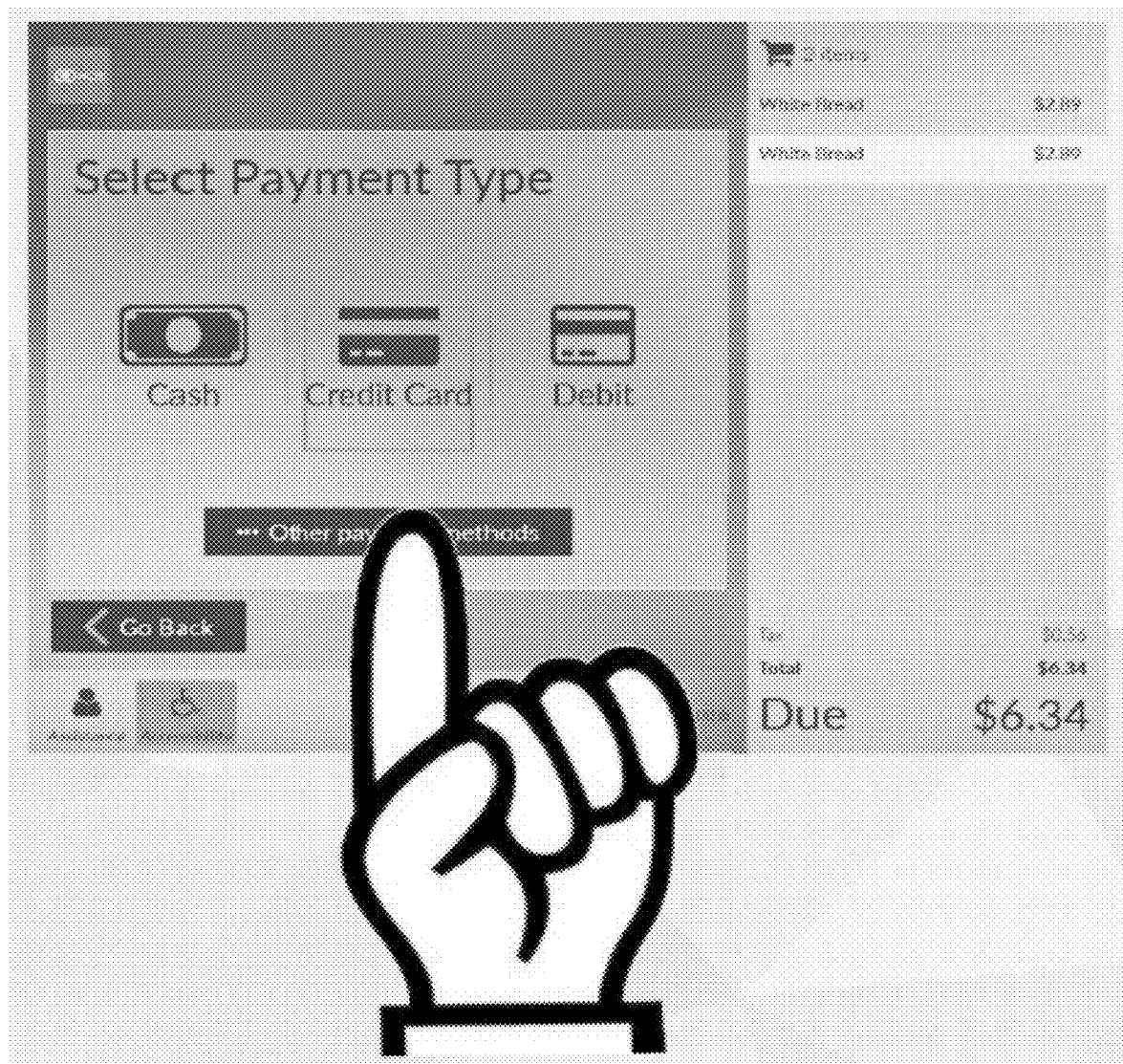
FIG. 1L is a diagram of a payment method selection screen for touchless terminal interface interaction, according to an example embodiment.

FIG. 1L is a diagram of a payment method selection screen for touchless terminal interface interaction, according to an example embodiment.

In FIG. 1L, the operator again extends the index finger into a hand pose and aligns that within the field with the "other payment methods" interface option presented within the screen of the transaction interface. Selection may be determined based on a length of time that the operator leaves the index finger over that interface option. For example, non-movement of the index finger for 2 seconds can be interpreted by touchless mapper/feedback manager 115 as a selection. Again, once touchless mapper/feedback manager 115 determines a selection is made of a corresponding interface option, the touchless mapper/feedback manager 115 uses the API and provides the selection to the transaction manager 114, which then performs the processing associated with the selection and updates the transaction interface accordingly and the rendered screens presented on the display 111.

The touchless mapper/feedback manager 115 may also present visual feedback within the rendered screens of the transaction interface. This can be done with the apparatus 170 being registered on terminal 110 as a novel HID for which the touchless mapper/feedback manager 115 is the HID driver that the OS of terminal 110 uses to get screen coordinates to display a visual identifier for a screen location of the operator's index finger, thumb, etc. In this way, as the operator places the index finger in locations within the field, the OS will display a cursor, an arrow, or other visual identifier showing the operator where the operator is presently pointing within the rendered screen.

In an embodiment, when apparatus 170 identifies a distance between the top of operator's index finger as being within a threshold distance of the surface of display 111, touchless mapper/feedback manager 115 causes a black circle or red visual indicator to be displayed within the screen. This permits the operator to have visual feedback when the operator is getting too close to the surface of display 111. In an embodiment, the distance between the operator's finger and the surface of the display 111 changes a thickness of a visual indicator within the rendered screen; so the farther way the finger is to the surface, the skinnier/thinner and/or smaller/shorter the visual indicator width and/or height is; and the closer the finger is to the surface the skinnier/thicker and/or larger/taller the visual indicator width and/or height is. In an embodiment, a range of colors from red, blue, yellow, green, and/or black forms a heat map displayed as a color for the visual indicator within the rendered screen based on the distance between the top of the index finger and the surface of the display 111; so, a distance that is past a first threshold may generate a bright red color for the visual indicator; a distance that is past a second threshold may generate a dim yellow color, a distance that is optimal may display as a blue or green color for the visual indicator.

In an embodiment, a predefined hand pose when the visual indicator is displayed on a given interface option may be used as an indication that the operator desires to select that interface option. For example, a thumbs up or just an extended thumb.

In an embodiment, predefined hand gestures may be used for navigation within any given screen such as a wave up, wave down, wave to the right, and wave to the left. In an embodiment, a thumb or index finger may be pointed down, up, right, and left for screen page navigation.

In an embodiment, a predefined hand gesture that simulates a double tap may be used as an indication of a selection of a given interface item.

In an embodiment, the hand poses, hand movements, and hand gestures interpreted by the touchless mapper/feedback manager 115 can be customized and defined within a control data structure, such that they can be customized for a given interface and processed by the touchless mapper/feedback manager 115.

In an embodiment, apparatus 170 comprises one or more Light Emitting Diodes (LED(s)) 190 affixed on bezel 111A of display 111 or adjacent and proximate to the display 111. The touchless mapper/feedback manager 115 illuminates the LED(s) 190 when the operator's hand is detected within the field produced by apparatus 170. The LEDs 190 can be different feedback colors and/or activated and deactivated to create illumination patterns for purposes of providing feedback to the operator during the transaction.

In an embodiment, apparatus 170 comprises a small speaker 180 affixed to mounting apparatus 130A, bezel 111A, or placed on a surface adjacent and proximate to display 111. In an embodiment, the speaker 180 is integrated into depth camera 120. The touchless mapper/feedback manager 115 plays sounds, beeps, or other customized audio to provide feedback that the operator is within the field, too close to the surface of the display 111A, too far away from the field, etc. In an embodiment, predefined speech may be played over the speaker 180 providing audio feedback to the operator during the transaction as well as instructions. In an embodiment, the touchless mapper/feedback manager 115 activates help speech based on inaction of the operator for a predefined period of elapsed time or based on an operated made hand gesture. The help speech speaks to the user in natural language audibly describing acceptable hand poses and gestures within a given context of the transaction interface or a given rendered screen on display 111 (so the speech-based help is context sensitive).

In an embodiment, apparatus 170 comprises a pair of laser lights situated on sides of the bezel 111A creating a laser field that is broken and altered when the operator's hand enters the laser field and moves within the laser field.

In an embodiment, the terminal 110 is a POS terminal with the operator being a clerk/teller; the terminal 110 is an SST with the operator being a customer that is performing a self-checkout transaction at the terminal 110; or the terminal is an Automated Teller Machine (ATM) with the operator being a customer that is performing a financial transaction at the terminal 110.

In an embodiment, the terminal 110 is a gaming machine, such as a slot machine or a video poker machine. The transaction interface is a gaming-based interface and the transaction manager 114 is a gaming transaction manager. This is particularly useful because gamblers often continuously touch the touch-screen gaming machine displays over and over again and may cough and sneeze on the surface of the displays, such that system 100 and apparatus 170 provides substantial improved health safety to the gamblers.

In an embodiment, peripheral devices 120-130 may be connected or interfaced to terminal 110 through a wired connection, such as Universal Serial Bus (USB) connections.

In an embodiment, peripheral devices 120-130 may be connected or interfaced to terminal 110 through wireless connections, such as Radio Frequency (RF) based BluTooth®, Near Field Communication (NFC), or Wi-Fi.

In an embodiment, some peripheral devices 120-130 may be connected or interfaced to terminal 110 through a wired connection while one or more others of peripherals 120-130 are connected or interfaced to terminal 110 through a wireless connection.

Figure 2:
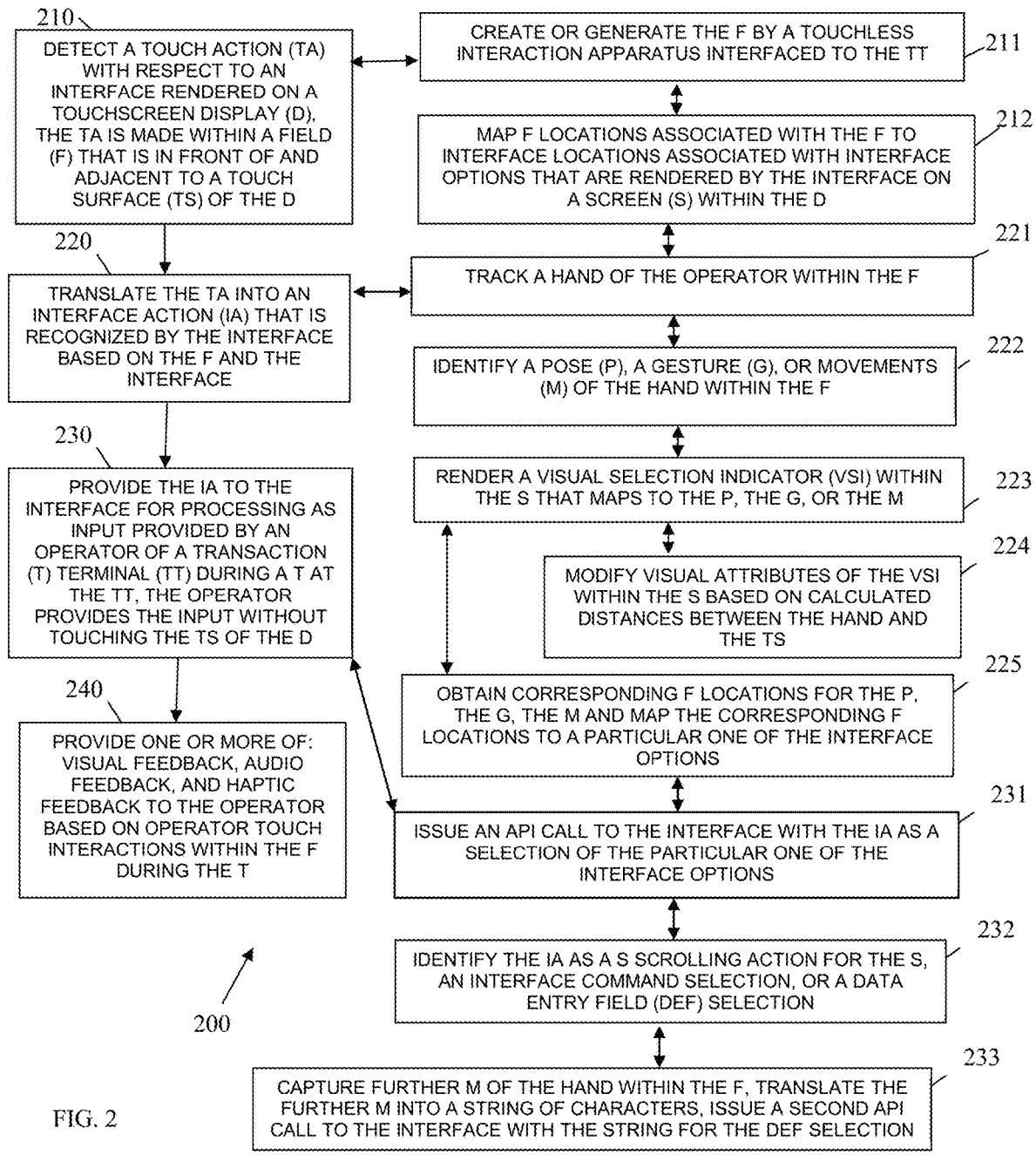
FIG. 2 is a diagram of a method for touchless terminal interface interaction, according to an example embodiment.

The above-noted embodiments and other embodiments are now discussed with FIG. 2.

FIG. 2 is a diagram of a method 200 for touchless terminal interface interaction, according to an example embodiment. The software module(s) that implements the method 200 is referred to as a "touchless interface interaction manager." The touchless interface interaction manager is implemented as executable instructions programmed and residing within memory and/or a non-transitory computer-readable (processor-readable) storage medium and executed by one or more processors of a transaction terminal. The processor(s) of the device that executes the touchless interface interaction manager are specifically configured and programmed to process the touchless interface interaction manager. The touchless interface interaction manager may have access to one or more network connections during its processing. The network connections can be wired, wireless, or a combination of wired and wireless.

In an embodiment, the touchless interface interaction manager executes on transaction terminal 110. In an embodiment, the terminal 110 is a POS terminal, a SST, an ATM, or a gaming terminal.

The device that executes the touchless interface interaction manager is interfaced or connected to apparatus 170.

In an embodiment, the touchless interface interaction manager is all or some combination of transaction manager 114 and touchless mapper/feedback manager 115.

At 210, the touchless interface interaction manager detects a touch action with respect to an interface that is rendered on touchscreen display. The touch action is made within a field that is in front of and adjacent to a touch surface of the touchscreen display.

In an embodiment, at 211, the touchless interface interaction manager creates or generates the field by a touchless interaction apparatus 170 that is interfaced to the transaction terminal 110.

In an embodiment of 211 and at 212, the touchless interface interaction manager maps field locations associated with the field to interface locations associated with interface options that are rendered by the interface on a screen within the display.

At 220, the touchless interface interaction manager translates the touch action into an interface action that is recognized by the interface based on the field and the interface.

In an embodiment of 212 and 220, at 221, the touchless interface interaction manager tracks a hand of the operator within the field.

In an embodiment of 221 and at 222, the touchless interface interaction manager identifies a pose, a gesture, or movements of the hand within the field.

In an embodiment of 222 and at 223, the touchless interface interaction manager renders a visual selection indicator with the screen that maps to the pose, the gesture, or the movements. The visual selection indicator is the visual indicator discussed above. Moreover, this can be achieved by providing at least a portion of the touchless interface interaction manager as a HID driver for an OS of the transaction terminal (as was also discussed above).

In an embodiment of 223 and at 224, the touchless interface interaction manager modifies visual attributes of the visual selection indicator within the screen based on calculated distances between the hand and the touch surface of the touchscreen display.

In an embodiment of 223 and at 225, the touchless interface interaction manager obtains corresponding field locations for the pose, the gesture, and the movements and maps the corresponding locations to a particular one of the interface options presented within the screen by the interface.

At 230, the touchless interface interaction manager provides the interface action to the interface for processing as input provided by an operator of the transaction terminal during a transaction at the transaction terminal. The operator provides the input without touching the touch surface of the touchscreen display.

In an embodiment of 225 and 230, at 231, the touchless interface interaction manager issues an API call to the interface with the interface action as a selection of the particular one of the interface options.

In an embodiment of 231 and at 232, the touchless interface interaction manager identifies the interface action as a scrolling action for the screen, an interface command selection or a data entry field selection.

In an embodiment of 232 and at 233, the touchless interface interaction manager captures further movements of the hand within the field, translates the further movements into a string of characters, issues a second API call to the interface with the string being provided as operator-provided and defined data input for the data entry field selection.

According to an embodiment, at 240, the touchless interface interaction manager provides one or more of: visual feedback, audio feedback, and haptic feedback to the operator based on operator touch interactions within the field during the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting a touch action with respect to an interface rendered on a touchscreen display, wherein the touch action is made within a field that is in front of and adjacent to a touch surface of the touchscreen display;
   translating the touch action into an interface action that is recognized by the interface based on the field and the interface; and
   providing the interface action to the interface for processing as an input provided by an operator of a transaction terminal during a transaction at the transaction terminal, wherein the operator provides the input without touching the touch surface of the touchscreen display.

2. The method of claim 1, wherein detecting further includes creating or generating the field by a touchless interaction apparatus interfaced to the transaction terminal.

3. The method of claim 2, wherein creating or generating further includes mapping field locations associated with the field to interface locations associated with interface options that are rendered by the interface on a screen within the touchscreen display.

4. The method of claim 3, wherein translating further includes tracking a hand of the operator within the field.

5. The method of claim 4, wherein tracking further includes identifying a pose, a gesture, or movements of the hand within the field.

6. The method of claim 5, wherein tracking further includes rendering a visual selection indicator within the screen that maps to the pose, the gesture, or the movements.

7. The method of claim 6, wherein rendering further includes modifying visual attributes of the visual selection indicator within the screen based on calculated distances between the hand and the touch surface.

8. The method of claim 5, wherein tracking further includes obtaining corresponding field locations for the pose, the gesture, or the movements and mapping the corresponding field locations to a particular one of the interface options.

9. The method of claim 8, wherein providing further includes issuing an Application Programming Interface (API) call to the interface with the interface action as a selection of the particular one of the interface options.

10. The method of claim 9, wherein issuing further includes identifying the interface action as a screen scrolling action for the screen, an interface command selection, or a data entry field selection request.

11. The method of claim 10, wherein identifying further includes capturing further movements of the hand within the field, translating the further movements into a string of characters, issuing a second API call to the interface with the string provided as operator-provided input to the data entry field selection request.

12. The method of claim 1 further comprising, providing one or more of:
visual feedback, audio feedback, and haptic feedback to the operator based on operator touch interactions within the field during the transaction.

13. An apparatus, comprising:
a depth camera adjacent to, attached to, or integrated into the touchscreen display of a transaction terminal; and
an Infrared (IR) motion device adjacent to or attached to a bezel of the touchscreen display;
wherein the IR motion device configured to create a field in front of and adjacent to a touch surface of the touchscreen display and to provide coordinates within the field for a hand of an operator who is performing a touchless interaction with an interface rendered in a screen of the touchscreen display during a transaction at the transaction terminal associated with the touchscreen display; and
where the depth camera configured to provide images or video of the hand during the touchless interaction along with distances between the hand and the touch surface of the touchscreen display.

14. The apparatus of claim 13 further comprising, at least one Light Emitting Diode (LED) configured to illuminate to provided feedback to the operator during the touchless interaction.

15. The apparatus of claim 13 further comprising, at least one haptic device configured to provided ultrasonic or vibrational feedback to the hand of the operator while the hand is within the field during the touchless interaction.

16. The apparatus of claim 13 further comprising, a speaker configured to play audio feedback to the operator during the touchless interaction within the field.

17. The apparatus of claim 13 further comprising, a mounting apparatus configured to hold the IR motion device and configured to attach to a bottom portion of a bezel of the touchscreen display.

18. The apparatus of claim 13, wherein depth camera is configured to be affixed or rest on a top portion of a bezel of the touchscreen display.

19. A system, comprising:
a transaction terminal; and
a touchless interface apparatus;
wherein the touchless interface apparatus comprises:
a depth camera; and
an Infrared (IR) motion device;
wherein the IR motion device is configured to create a field in front of and adjacent to a touch surface of a touchscreen display and to provide coordinates within the field for a hand of an operator who is performing a touchless interaction with an interface rendered in a screen of the touchscreen display during a transaction at the transaction terminal associated with the touchscreen display; and
wherein the depth camera is configured to provide images or video of the hand during the touchless interaction along with distances between the hand and the touch surface of the touchscreen display;
wherein the transaction terminal comprises:
the touchscreen display;
a processor;
a non-transitory computer-readable storage medium comprising executable instructions; and
the executable instructions when executed by the processor from the non-transitory computer-readable storage medium cause the processor to perform processing comprising:
monitoring and tracking the hand during the touchless interaction within the field based on the coordinates;
monitoring the images or the video of the hand and the distances between the hand and the touch surface of the touchscreen display;
mapping hand movements, hand poses, or hand gestures for the hand within the field to interface options presented by the interface within the screen based on the coordinates, the images or the video, and the screen rendered by the interface; and
providing the interface options to the interface during the transaction as the touchless interaction for processing by the interface without the operator touching the touch surface of the touchscreen display.

20. The system of claim 19, wherein the transaction terminal is one of: An Automated Teller Machine (ATM), a Point-Of-Sale (POS) terminal, a Self-Service Terminal (SST), or a gaming terminal.

* * * * *